United States Patent
Conover et al.

(10) Patent No.: US 7,272,748 B1
(45) Date of Patent: Sep. 18, 2007

(54) METHOD AND APPARATUS TO DETECT AND RECOVER FROM A STACK FRAME CORRUPTION

(75) Inventors: Matthew Conover, Mountain View, CA (US); Sourabh Satish, Mountain View, CA (US)

(73) Assignee: Symantec Corporation, Cuperino, CA (US)

( * ) Notice: Subject to any disclaimer, the term of this patent is extended or adjusted under 35 U.S.C. 154(b) by 605 days.

(21) Appl. No.: 10/803,848

(22) Filed: Mar. 17, 2004

(51) Int. Cl.
*G06F 11/00* (2006.01)

(52) U.S. Cl. .................. 714/20; 712/233; 712/244; 714/15; 714/42

(58) Field of Classification Search ............. 714/20
See application file for complete search history.

(56) References Cited

U.S. PATENT DOCUMENTS

| | | | | |
|---|---|---|---|---|
| 5,530,802 A * | 6/1996 | Fuchs et al. | ............... | 714/17 |
| 5,630,066 A * | 5/1997 | Gosling | ............... | 709/221 |
| 5,668,999 A * | 9/1997 | Gosling | ............... | 717/126 |
| 5,805,470 A * | 9/1998 | Averill | ............... | 703/27 |
| 5,887,007 A * | 3/1999 | Iwata et al. | ............... | 714/795 |
| 5,958,003 A * | 9/1999 | Preining et al. | ............... | 718/100 |
| 6,052,732 A * | 4/2000 | Gosling | ............... | 709/229 |
| 6,075,940 A * | 6/2000 | Gosling | ............... | 717/126 |
| 6,119,206 A * | 9/2000 | Tatkar et al. | ............... | 711/147 |
| 6,269,436 B1 * | 7/2001 | Tran et al. | ............... | 712/23 |
| 6,453,278 B1 * | 9/2002 | Favor et al. | ............... | 703/27 |
| 6,704,923 B1 * | 3/2004 | Gosling | ............... | 717/126 |
| 6,829,719 B2 * | 12/2004 | Anvin et al. | ............... | 714/2 |
| 6,851,073 B1 * | 2/2005 | Cabrera et al. | ............... | 714/15 |
| 6,954,922 B2 * | 10/2005 | Liang | ............... | 717/130 |
| 7,162,662 B1 * | 1/2007 | Svarcas et al. | ............... | 714/15 |
| 7,197,665 B2 * | 3/2007 | Goldstein et al. | ............... | 714/20 |
| 2002/0129226 A1 * | 9/2002 | Eisen et al. | ............... | 712/228 |
| 2004/0049660 A1 * | 3/2004 | Jeppesen et al. | ............... | 712/219 |

OTHER PUBLICATIONS

Chien, E. and Szor, P., "Blended Attacks Exploits, Vulnerabilities and Buffer-overflow Techniques in Computer Viruses", Virus Bulletin Conference, Sep. 2002, pp. 1-36.

Huang, Yinrong, "Protection Against Exploitation of Stack and Heap Overflows", Exurity, Inc., Canada, Apr. 11, 2003, pp. 1-10 [online]. Retrieved on Jun. 9, 2004. Retrieved from the Internet: <URL:http://www.cgisecurity.com/lib/AntiOverflows.pdf>.

(Continued)

*Primary Examiner*—Scott Baderman
*Assistant Examiner*—Loan Truong
(74) *Attorney, Agent, or Firm*—Gunnison, McKay & Hodgson, L.L.P.; Lisa A. Norris

(57) ABSTRACT

A prologue and an epilogue of a function are hooked. Completion of the prologue is stalled in a first state of a stack frame, and a copy of the first state of the stack frame is saved. Completion of the prologue is initiated, permitting execution of the function. Completion of the epilogue is stalled in a second state of the stack frame. The saved copy of the first state of the stack frame is located and compared with the second state of the stack frame. A determination is made whether the stack frame is corrupted based on the comparison. Upon a determination that the stack frame is corrupted, the second state of the stack frame is replaced with the copy of the first state of the stack frame, and completion of the epilogue is initiated, allowing the function to complete.

20 Claims, 8 Drawing Sheets

OTHER PUBLICATIONS

No author, "Immunix Canary Patch to GCC 2.7.2.2—A Buffer Overflow Exploit Detector", pp. 1-4 [online]. Retrieved on Feb. 10, 2004. Retrieved from the Internet: <URL:http://www.ussrback.com/UNIX/utilities/stackguard/stackguard-gcc.README>.

* cited by examiner

KEY TO FIG. 2

METHOD AND APPARATUS TO DETECT AND RECOVER FROM A STACK FRAME CORRUPTION

BACKGROUND OF THE INVENTION

1. Field of the Invention

The present invention relates to the protection of computer systems. More particularly, the present invention relates to a system and method for detecting and recovering from a stack frame corruption.

2. Description of the Related Art

Buffer overflow techniques have been used by malicious hackers and virus writers to attack computer systems. Buffers are data storage areas, which generally hold a predefined amount of data. A buffer overflow occurs when an application attempts to store data into the buffer, where the data is larger than the size of the buffer.

One category of buffer-overflow sometimes called stack-based buffer overflow, involves overwriting a stack memory, or stack. The stack is basically an area in memory at run-time that an application uses to store data temporarily.

A stack-based buffer overflow is typically caused by exploitation of a function that does not verify the length of the data being copied into a buffer. When the data exceeds the size of the buffer, the extra data can overflow into the adjacent memory locations in the stack. In this manner, it is possible to corrupt valid data and possibly to change the execution flow. Thus, by exploiting a buffer overflow, it is possible to inject malicious code into the execution flow of an application.

To detect corruptions of the stack, some prior art detection systems placed a canary value before each stack frame of an application's functions in the stack. The canary value was saved at each prologue of a function and checked at each epilogue of a function. If a change was detected, the application was terminated or a security handler was called.

Thus, these prior art detection systems were designed to detect stack frame violations and terminate the application. Consequently, the availability of the application was lost until the application could be restarted, typically detrimentally impacting system performance. Additionally, as these prior art detection systems were compiler-based solutions, the source code of the application was required or the vendor compiled the application with the stack frame violation detection.

SUMMARY OF THE INVENTION

In accordance with one embodiment of the invention, a method includes stalling the completion of a function prologue, the function having an associated first state of a stack frame on a stack. A copy of the first state of the stack frame is saved, and completion of the function prologue is initiated, thus permitting execution of the function. The completion of the function epilogue is stalled, the function having an associated second state of the stack frame on the stack. The second state of the stack frame is compared to the copy of the first state of the stack frame, and a determination is made whether the stack frame is corrupted based on the comparison. For example, if the second state of the stack frame and the copy of the first state of the stack frame are different, the stack frame is determined to be corrupted, otherwise, if the copy of the first state of the stack frame and the second state of the stack frame are the same, the stack frame is determined not to be corrupted.

Upon a determination that the stack frame is corrupted, the second state of the stack frame is replaced with the copy of the first state of the stack frame, and completion of the function epilogue is initiated, thus permitting completion of the function. Optionally, a notification of the stack frame corruption is generated, for example by logging the event or generating a message, thus providing notice of the suspicious event, for example, to a system administrator.

By checking an application for stack frame corruptions during run-time, stack frame corruptions can be detected and the stack frames restored, allowing the survival of the application beyond the stack frame corruptions and continued availability of the application.

Embodiments in accordance with the present invention are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Figure 2A:
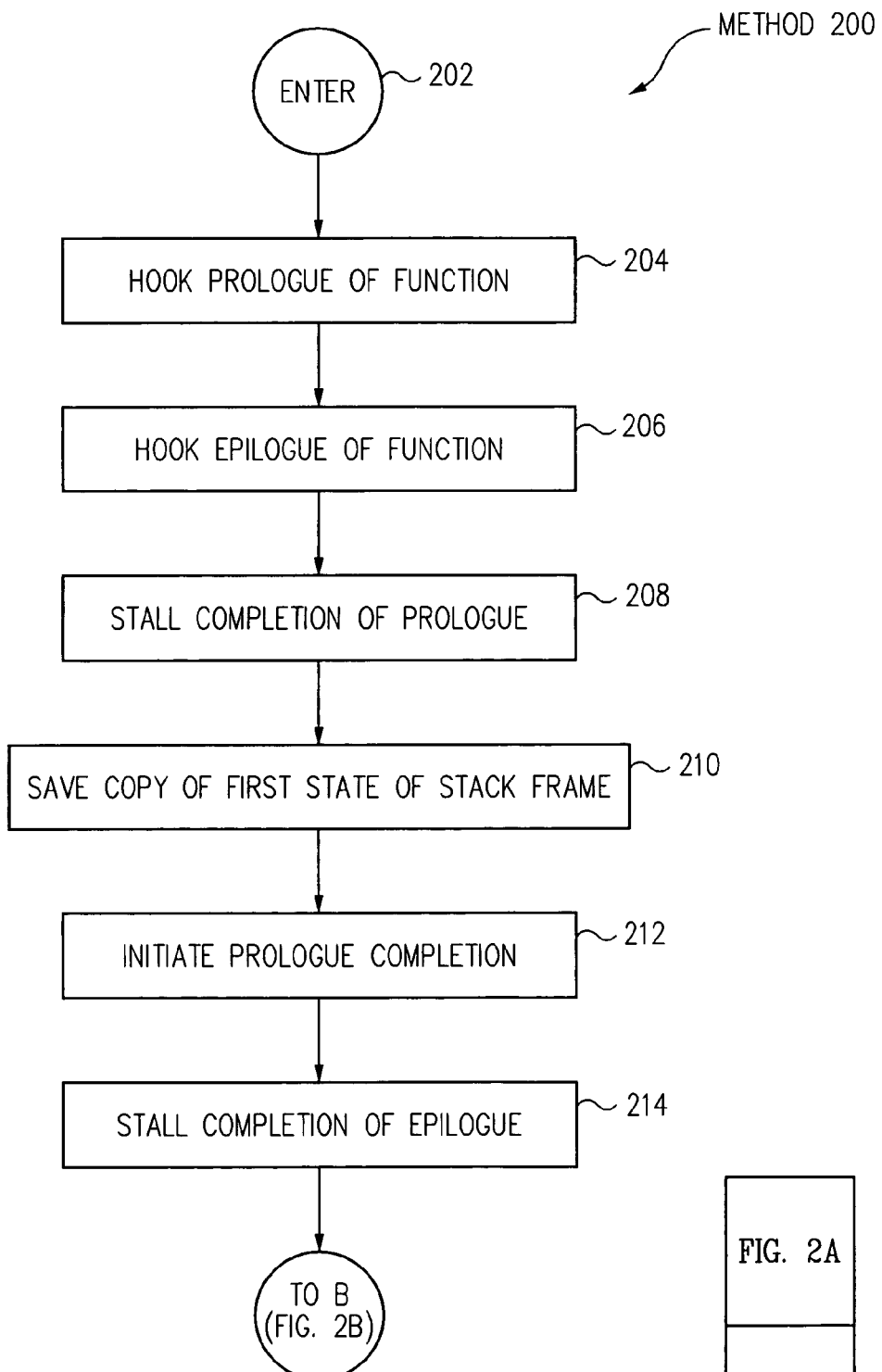
FIG. 2 is a key to FIGS. 2A and 2B that illustrate an example of a method for detecting corruption of a stack frame and for restoring a corrupted stack frame in accordance with one embodiment of the present invention.
Figure 2A:
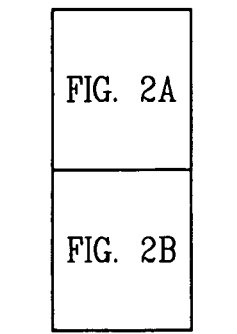
Figure 2B:
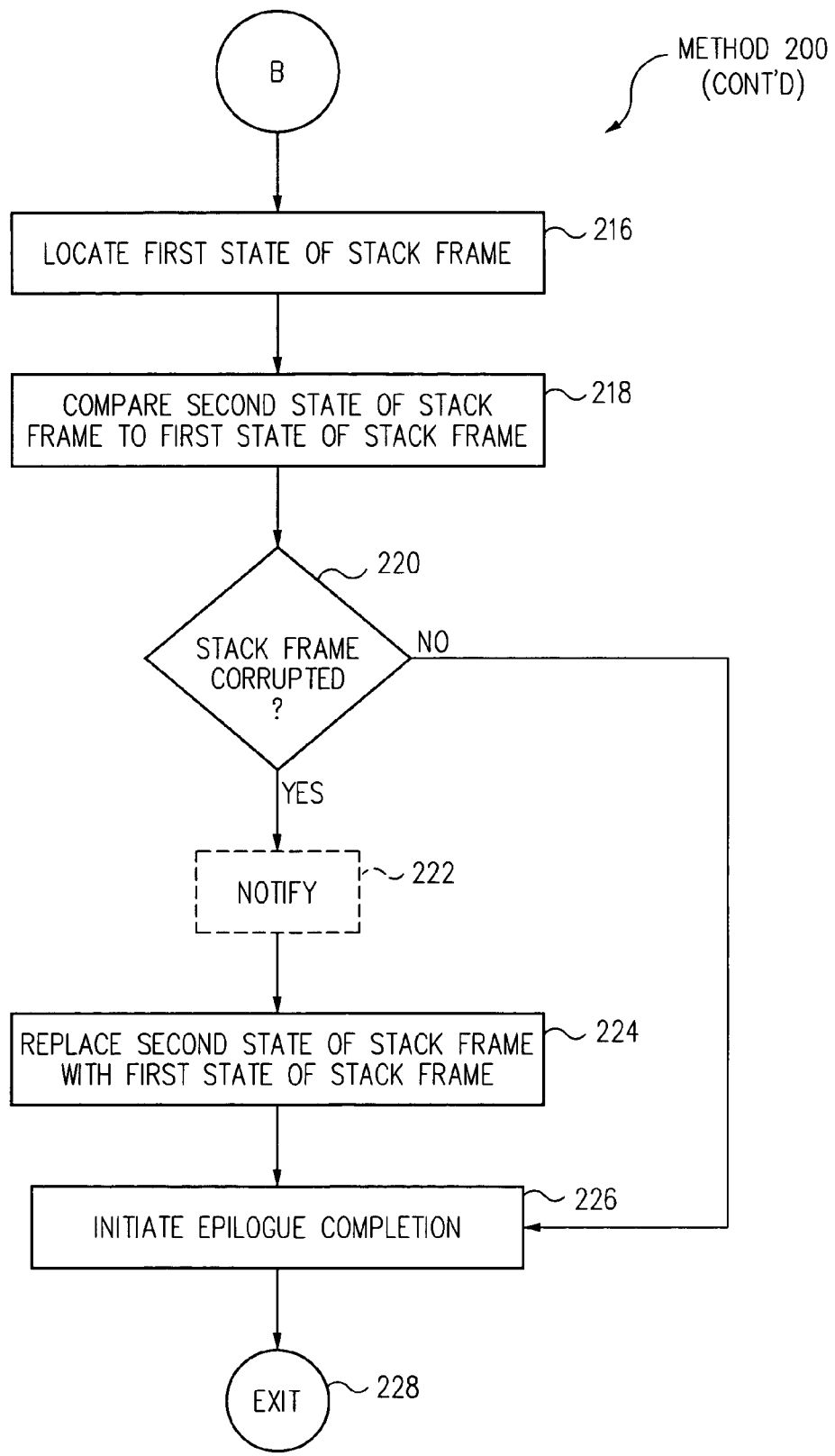

In accordance with one embodiment, referring to FIGS. 2A and 2B, a method includes hooking a prologue and an epilogue of a function (operations 204-206), and stalling completion of the prologue (operation 208). A copy of a first state of a stack frame associated with the function is saved to a memory location other than the stack in which the stack frame is located, such as in a heap (operation 210), and the prologue is initiated, permitting completion of the prologue, and execution of the function (operation 212).

The completion of the epilogue of the function is stalled, thus stalling completion of the function (operation 214), where a second state of the stack frame is present in the stack. The copy of the first state of the stack frame is located (operation 216), and the second state of the stack frame is compared to the copy of the first state of the stack frame (operation 218). A determination is made whether the stack frame is corrupted based upon the comparison (operation 220). Upon a determination that the stack frame is corrupted, a notification of the stack frame corruption is optionally generated (operation 222), the second state of the stack frame is replaced with the copy of the first state of the stack frame (operation 224), and the epilogue is initiated, permitting completion of the epilogue, and completion of the function (operation 226).

Thus, potentially fatal corruptions of a stack frame are detected and the initial stack frame restored without termination of the application allowing continued execution of the application beyond the stack frame corruption.

Figure 1:
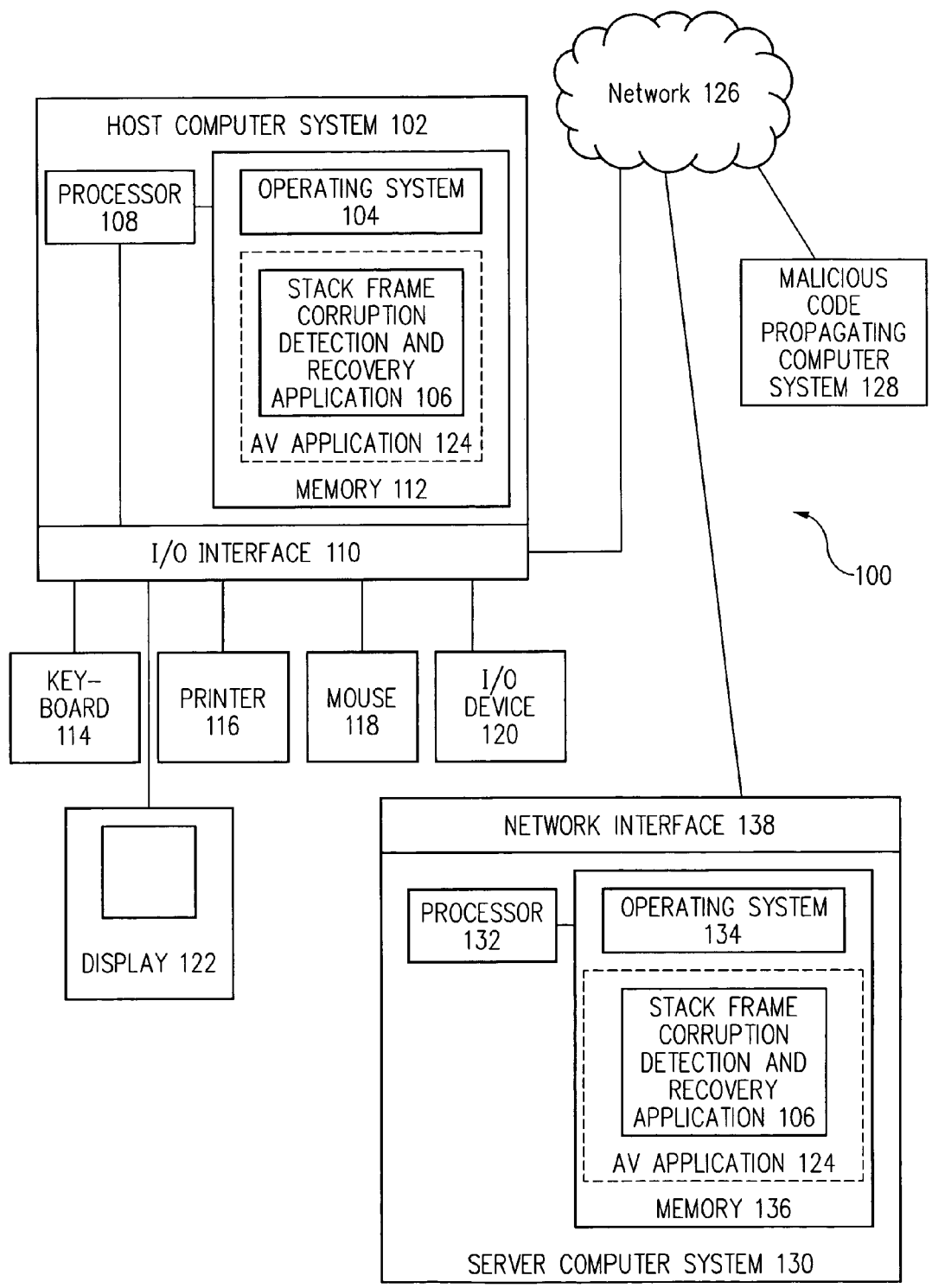
FIG. 1 illustrates a diagram of a client-server system that includes a stack frame corruption detection and recovery application executing on a host computer system in accordance with one embodiment of the present invention.

Particularly, FIG. 1 illustrates a diagram of a client-server system 100 that includes a stack frame corruption detection and recovery application 106 executing on a host computer system 102 in accordance with one embodiment of the present invention. In one embodiment, host computer system 102 is a stand-alone computer system, such as a personal computer or workstation, as illustrated in FIG. 1 by host computer system 102. In other embodiments, host computer system 102 is configured as part of client-server system 100, also illustrated in FIG. 1, in which host computer system 102 interacts with a server computer system 130 via a network 126, such as the Internet.

Stack frame corruption detection and recovery application 106 is described herein as executed on host computer system 102, e.g., a first computer system. However, in light of this disclosure, those of skill in the art can understand that the description is applicable to client-server system 100 and other computer systems interacting simultaneously or serially with server computer system 130, e.g., a second computer system.

Host computer system 102, sometimes called a client or user device, typically further includes a processor 108, an input/output (I/O) interface 110, an operating system 104, and a memory 112. In one embodiment, memory 112 includes a main memory, as well as any supplemental memories, and includes executable areas, data storage areas, stack memory, heap memory, and any memory areas needed by host computer system 102 (including operating system 104 and processor 108).

Host computer system 102 may additionally include: standard input devices, such as a keyboard 114 and a mouse 118; standard output devices, such as a printer 116 and a display 122; as well as, one or more standard input/output (I/O) devices 120, such as a compact disk (CD) or DVD drive, floppy disk drive, or other digital or waveform port for inputting data to and/or outputting data from host computer system 102.

In one embodiment, stack frame corruption detection and recovery application 106 is loaded into memory 112 of host computer system 102 via I/O device 120, such as from a CD or floppy disk containing stack frame corruption detection and recovery application 106. Optionally, in some embodiments, stack frame corruption detection and recovery application 106 is loaded into memory 112 as part of another application, such as anti-viral (AV) application 124.

In other embodiments, such as client-server embodiments, stack frame corruption detection and recovery application 106 is stored on server computer system 130 and downloaded to host computer system 102 via a network, such as network 126. Optionally, in some embodiments, stack frame corruption detection and recovery application 106 is downloaded to host computer system 102 as part of another application, such as AV application 124.

As illustrated, in one embodiment, server computer system 130 of client-server system 100 is coupled to host computer system 102 by network 126. Network 126 is any network or network system that is of interest to a user.

Server computer system 130 typically includes: a network interface 138 for communicating with network 126; a processor 132; an operating system 134; and, a memory 136. As earlier described, in some embodiments, stack frame corruption detection and recovery application 106 is stored in memory 136 for downloading to host computer system 102. Server computer system 130 can further include a display, a keyboard, a mouse, and other input/output (I/O) devices (not shown).

As shown in FIG. 1, in one embodiment, malicious code propagating computer system 128, similar to host computer system 102, is coupled to host computer system 102 and server computer system 130 by network 126. Thus, host computer system 102 could receive malicious code, such as stack-based buffer overflow malicious code, from or propagate malicious code to any, all, or some of malicious code propagating computer system 128 and server computer system 130 via network 126.

The particular type of and configuration of host computer system 102, malicious code propagating computer system 128, and server computer system 130 are not essential to this embodiment of the present invention. In various embodiments, network interface 138 and I/O interface 110 include analog modems, digital modems, or a network interface card.

FIG. 2 is a key to FIGS. 2A and 2B that illustrate an example of a method 200 for detecting corruption of a stack frame and for restoring a corrupted stack frame in accordance with one embodiment of the present invention. Referring now to FIGS. 1, 2A and 2B together, in one embodiment, execution of stack frame corruption detection and recovery application 106 by processor 108 results in the operations of host computer process 200 as described below.

From an ENTER operation 202, processing transitions to a HOOK PROLOGUE OF FUNCTION operation 204.

In HOOK PROLOGUE OF FUNCTION operation 204, the prologue of a function is hooked. In particular, in one embodiment, a prologue of a function having a standard prologue and a standard epilogue is hooked.

Generally, the code of an application is organized into functions that execute specific tasks, or procedures. When the application code is compiled into machine instructions, the start of each of the functions is signaled using a prologue, and the end of each of the functions is signaled using an epilogue.

The prologue is code at the beginning of a function that typically saves space on a stack for local variables, initializes registers, and pushes registers that the function uses. The prologue also typically sets up a local stack pointer to enable access to parameters on the stack from within the function. The following is a general example of a standard prologue used on x86 processors:

PUSH EBP
MOV EBP,ESP
SUB ESP,0Ch.

Although the above presented standard prologue is provided as an example, other standard prologue codes are also utilized by various computer processors and are well known to those of skill in the art and are not further described herein to avoid detracting from the description of the invention.

In one embodiment, a prologue hook function of stack frame corruption detection and recovery application 106 hooks the standard prologue of a function, or otherwise injects or overwrites the standard prologue code, so that the execution of the standard prologue can be stalled and the execution path redirected to stack frame corruption detection and recovery application 106. Hooking of a prologue of a function is well known to those of skill in the art and is not further described herein to avoid detracting from the description of the invention. From HOOK PROLOGUE OF FUNCTION operation 204, processing transitions to a HOOK EPILOGUE OF FUNCTION operation 206.

In HOOK EPILOGUE OF FUNCTION operation 206, the epilogue of the function is hooked. The epilogue is code at the end of a function that typically pops registers and returns from the function. The following is a general example of a standard epilogue used on x86 processors:

MOV ESP,EBP
    POP EBP
    RET.

Although the above presented standard epilogue is provided as example, other standard epilogue codes are also utilized by various computer processors and are well known to those of skill in the art and are not further described herein to avoid detracting from the description of the invention.

For example, in one embodiment, an epilogue hook function of stack frame corruption detection and recovery application 106 hooks the standard epilogue of the function, or otherwise injects or overwrites the standard epilogue code, so that execution of the standard epilogue can be stalled and the execution path redirected to stack frame corruption detection and recovery application 106. Hooking of an epilogue of a function is well known to those of skill in the art and is not further described herein to avoid detracting from the description of the invention. From HOOK EPILOGUE OF FUNCTION operation 206, processing waits to intercept an initiated execution of a prologue to a function (due to the hooking of the prologue of the function), and upon interception, transitions to a STALL COMPLETION OF PROLOGUE operation 208.

In STALL COMPLETION OF PROLOGUE operation 208, completion of the execution of the prologue is stalled and execution is redirected to stack frame corruption detection and recovery application 106, thus stalling the start of the execution of the associated function. From STALL COMPLETION OF PROLOGUE operation 208, processing transitions to a SAVE COPY OF FIRST STATE OF STACK FRAME operation 210.

In SAVE COPY OF FIRST STATE OF STACK FRAME operation 210, a copy of a first state of a stack frame associated with the function is saved. In one embodiment, the first state of the stack frame is defined as the current state of the stack frame at the time when execution of the prologue is stalled.

In one embodiment, a copy of the first state of the stack frame, also termed herein a saved stack frame, is saved to an area of memory 112 that is locatable by stack frame corruption detection and recovery application 106. In one embodiment, the copy of the first state of the stack frame is saved to an area of memory 112 different from the stack. In one embodiment, the copy of the first state of the stack frame is saved to a heap memory, also termed a heap buffer or simply a heap, and the address of the copy of the first state of the stack frame in the heap memory is saved to a hash table using the extended base pointer (EBP) of the stack frame in the stack. Generally, a heap is an area of memory used for dynamic memory allocation where blocks of memory are allocated and freed in an arbitrary order. Further, the EBP is the register value that points to an associated stack frame within a stack. Heap memory and the EBP are well known to those of skill in the art and are not further described herein to avoid detracting from the description of the invention.

In one embodiment, the hash table is used to quickly save and reference a saved copy of a first state of a stack frame based on the EBP associated with the stack frame. The hash table contains a fixed number of entries and uses EBP as the key to an entry in the hash table. In one embodiment, each entry contains 8 bytes—the saved EBP and a 32-bit pointer to a memory block large enough to save the particular copy of the first state of the stack frame. In the event of collision, for example, when the hash table returns two different saved copies of a first state of a stack frame for the same EBP, in one embodiment, linear probing is used to find a free entry or the matching entry.

The following is an example of a function for defining a hash table that uses EBP as a key to the location of a saved copy of a first state of a stack frame:

```
define TBLSIZE 64
HASH_ENTRY_SavedFrameHashTable [TBLSIZE]//key==(EBP <<8)
%TBLSIZE
typedef struct_HASH_ENTRY
{
    DWORD EBP;//note:this is the EBP to the new
frame;EBP!=Frame->EBP
    STACK_FRAME*Frame;
}
typedef struct_STACK_FRAME
{
    DWORD ParamCnt;
    BYTE*EBP;
    BYTE*EIP;
    DWORD Parameters[0];//there are ParamCnt parameters
starting here
}
```

The following is an example of a function for saving a copy of a first state of a stack frame to a location in memory that is referenced to the hash table:

```
BOOL SaveStackFrame (BYTE*EBP)
{
    int i = ((DWORD)EBP<<8)%TBLSIZE;
    int end_i=i-1;
    int FrameSize=sizeof (BYTE*) *2+sizeof (DWORD)*ParamCnt;
    for(i=EBP;SavedFrameHashTable [i%TBLSIZE].EBP!=0;i++)
    {
        if ((i%TBLSIZE) ==end_i) return FALSE;//no free entries
    }
    i%=TBLSIZE;
    SavedFrameHashTable[i].EBP=EBP;
    SavedFrameHashTable[i].Frame=(STACK_FRAME*) malloc
      (FrameSize);
    SavedFrameHashTable[i].Frame->ParamCnt=ParamCnt;
    //Copy EBP, EIP, and the parameters (skipping over ParamCnt,
    set above)
    memcpy(
        (BYTE*) SavedFrameHashTable[i].Frame+sizeof (DWORD),
        EBP,
        FrameSize
    );
    return TRUE;
}
```

In one embodiment, enough memory is allocated in memory 112 of host computer system 102 to save the copy of the first state of the stack frame. In one embodiment, enough memory is allocated in a heap memory of memory 112 of host computer system 102 to save a previous frame EBP (which points to the previous function's frame), a return address, and the parameters of the function in the stack frame.

In one example, the number of parameters can be determined utilizing the function's return address. The address of an instruction previous to the current instruction is determined (this should be the address of the CALL instruction to a hooked function that is prior to the return address of the current function). The number of PUSH instructions is determined, going backwards until a branch instruction, for example, JMP, CALL, RET, INT, and conditional jumps, is located. The number of PUSH instructions provides the number of parameters. From SAVE COPY OF FIRST STATE OF STACK FRAME operation 210, processing transitions to an INITIATE PROLOGUE COMPLETION operation 212.

In INITIATE PROLOGUE COMPLETION operation 212, the prologue of the function that is stalled in STALL COMPLETION OF PROLOGUE operation 208, is initiated, e.g., restored. Once initiated, execution of the function begins after the prologue as the prologue hook function set up the stack properly, e.g., restored the prologue of the function. Thus, in one embodiment, the prologue hook function performs at least two functions: hooking the prologue of the function to stall execution of the function and allow a copy of a first state of the stack frame to be saved to memory; and restoring the prologue to allow prologue completion and function execution. From INITIATE PROLOGUE COMPLETION operation 212, processing waits to intercept an initiated execution of the epilogue to the function (due to the hooking of the epilogue of the function), and upon interception, processing transitions to a STALL COMPLETION OF EPILOGUE operation 214.

In STALL COMPLETION OF EPILOGUE operation 214, completion of the execution of the epilogue is stalled and execution is redirected to stack frame corruption detection and recovery application 106, thus stalling the completion of the function processes. From STALL COMPLETION OF EPILOGUE operation 214, processing transitions to LOCATE FIRST STATE OF STACK FRAME operation 216.

In LOCATE FIRST STATE OF STACK FRAME operation 216, the copy of the first state of the stack frame is located in memory. In one embodiment, the copy of the first state of the stack frame is located in the heap memory using the current EBP as a key into the hash table, i.e., as a key to the address entry (for the first state of the stack frame) in the hash table.

The following is an example of a function for locating the copy of the first state of the stack frame:

```
STACK_FRAME*FindStackFrame (BYTE*EBP)
{
    int I=(EBP<<8)%TBLSIZE;
    int end_i=i-1;
    for (i=EBP;SavedFrameHashTable [i%TBLSIZE].EBP!=EBP; i++)
    {
        if ((i%TBLSIZE) ==end_i) returnNULL; //no matching entry found
    }
    return SavedFrameHashTable [i%TBLSIZE].Frame;
}
```

From LOCATE FIRST STATE OF STACK FRAME operation 216, processing transitions to a COMPARE SECOND STATE OF STACK FRAME TO FIRST STATE OF STACK FRAME operation 218.

In COMPARE SECOND STATE OF STACK FRAME TO FIRST STATE OF STACK FRAME operation 218, the contents of a second state of the stack frame (at EBP) is compared to the contents of the copy of the first state of the stack frame, for example, using a byte to byte comparison. In one embodiment, the second state of the stack frame is defined as the current state of the stack frame at the time when the epilogue of the function is stalled.

In one embodiment, the previous frame EBP, the return address, and the parameters of the function in the second state of the stack frame are compared to the previous frame EBP, the return address, and the parameters of the function in the copy of the first state of the stack frame. In one embodiment, if the contents of the second state of the stack frame are the same as the contents of the copy of the first state of the stack frame, for example, all bytes are the same, a determination is made that the stack frame is not corrupted.

Alternatively, if the contents of the second state of the stack frame are different from (not the same as) the contents of the copy of the first state of the stack frame, for example, one or more bytes different, a determination is made that the stack frame is corrupted. From COMPARE SECOND STATE OF STACK FRAME TO FIRST STATE OF STACK FRAME operation 218, processing transitions to a STACK FRAME CORRUPTED check operation 220.

In STACK FRAME CORRUPTED check operation 220, a determination is made whether the stack frame is corrupted based upon the comparison in operation 218. In one embodiment, if the contents of the second state of the stack frame are determined to be the same as the copy of the first state of the stack frame in COMPARE SECOND STATE OF STACK FRAME TO FIRST STATE OF STACK FRAME operation 218, the stack frame is determined not to be corrupted, and processing transitions from STACK FRAME CORRUPTED check operation 220 to an INITIATE EPILOGUE COMPLETION operation 226.

In INITIATE EPILOGUE COMPLETION operation 226, the epilogue of the function that is stalled in STALL COMPLETION OF EPILOGUE operation 214, is initiated, e.g., restored. Once initiated, completion of the function resumes after the epilogue as the epilogue hook function set up the stack properly, e.g., restored the epilogue of the function.

Thus, in one embodiment, the epilogue hook function performs at least two functions: hooking the epilogue of the function to stall completion of the function so that a second state of the stack frame can be compared to a copy of the first state of the stack frame; and restoring the epilogue to allow epilogue and function completion. From INITIATE EPILOGUE COMPLETION operation 226, processing transitions to an EXIT operation 228, in which processing exits method 200, or returns to STALL COMPLETION OF PROLOGUE operation 208.

Referring again to STACK FRAME CORRUPTED check operation 220, alternatively, upon a determination that the second state of the stack frame is different from the copy of the first state of the stack frame, a determination is made that the stack frame is corrupted. The epilogue of the function remains stalled, and processing transitions from STACK FRAME CORRUPTED check operation 220 to an optional NOTIFY operation 222, or directly to a REPLACE SECOND STATE OF STACK FRAME WITH FIRST STATE OF STACK FRAME operation 224.

In optional NOTIFY operation 222, the user of host computer system 102 and/or a system administrator are notified of the stack frame corruption. The user and/or system administrator can be notified using any one of a number of techniques, for example by logging the stack frame corruption as an event entry in an event log or event viewer, by using a pop up or alert window, and/or by writing to a file. From optional NOTIFY operation 222, processing transitions to REPLACE SECOND STATE OF STACK FRAME WITH FIRST STATE OF STACK FRAME operation 224.

In REPLACE SECOND STATE OF STACK FRAME WITH FIRST STATE OF STACK FRAME operation 224, the second state of the stack frame at EBP is replaced with the copy of the first state of the stack frame, for example, by a direct memory overwrite of the second state of the stack frame at EBP with the copy of the first state of the stack frame. In particular, in one embodiment, the previous frame EBP, the return address, and the parameters of the function in the second state of the stack frame are replaced with the previous frame EBP, the return address, and the parameters of the function in the copy of the first state of the stack frame.

Consequently, corruption of the stack frame, which can be due to malicious code, or other factors, is removed and the stack frame restored to an initial state, permitting continued execution of the function and availability of an encompassing application without the need to terminate the application. Processing transitions from REPLACE SECOND STATE OF STACK FRAME WITH FIRST STATE OF STACK FRAME operation 224, to INITIATE EPILOGUE COMPLETION operation 226 as earlier described, with processing exiting method 200 at EXIT operation 228, or waiting for the next direction of execution to a hooked prologue with return to STALL COMPLETION OF PROLOGUE operation 208.

Figure 3A:
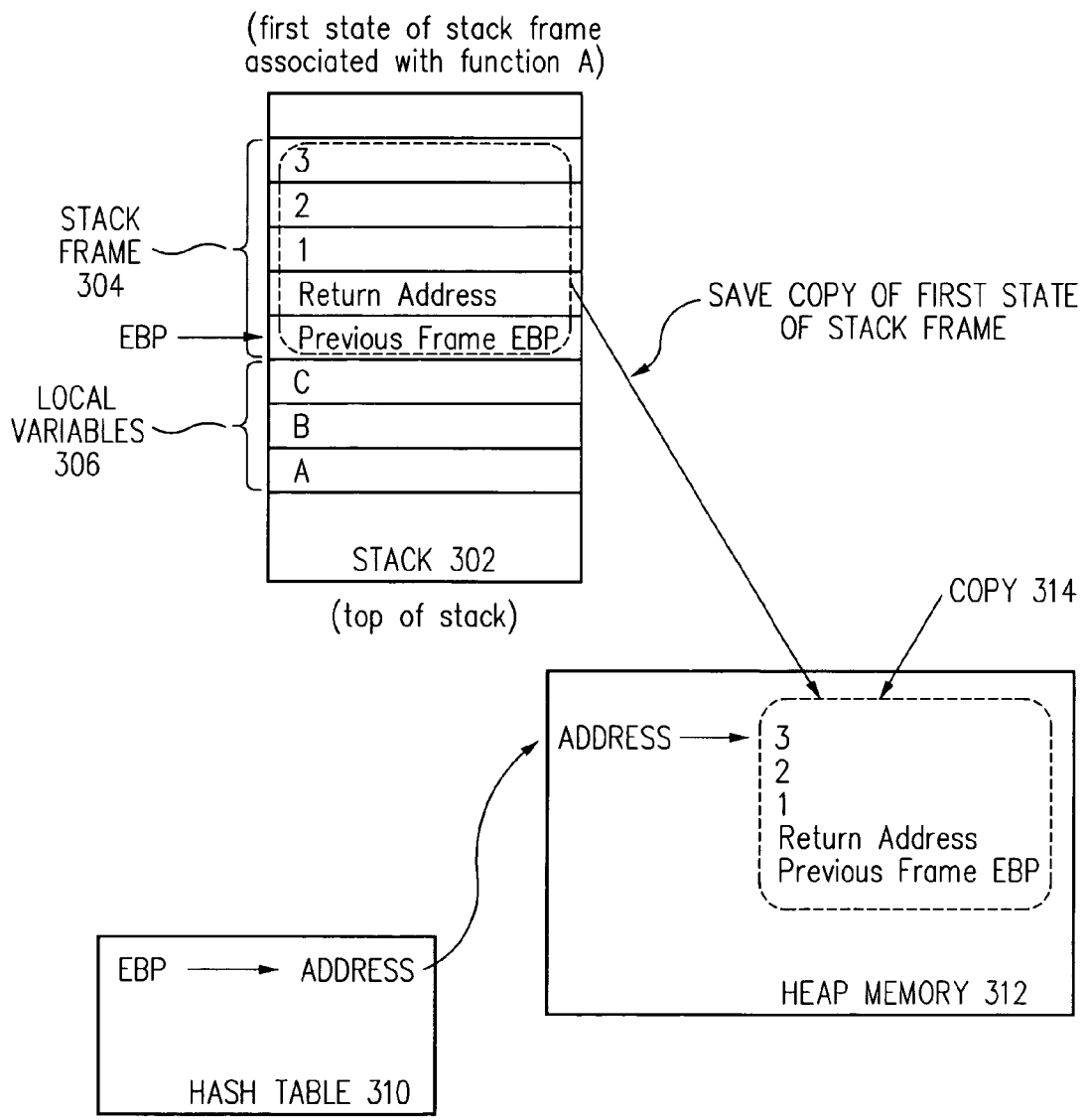
FIG. 3A illustrates a pseudocode representation of a first state of a stack frame saved as a copy to a heap memory in accordance with one embodiment of the present invention.

FIG. 3A illustrates a pseudocode representation of a first state of a stack frame 304 saved as a copy 314 to a heap memory 312 in accordance with one embodiment of the present invention. Referring now to FIGS. 2A, 2B, and 3A, as illustrated, a stack 302 including stack frame 304 and a set of local variables 306 associated with a function A of an application is represented in a first state during the operations of method 200 when the completion of the prologue of function A is stalled. Thus, in one embodiment, the prologue of function A is stalled (operation 208) and a copy of the first state of stack frame 304, illustrated as a copy 314, is saved to a location in memory, such as a heap memory 312 (operation 210).

In one embodiment, as earlier described with reference to operation 210 of method 200 (FIG. 2), the first state of the stack frame 304 includes data representing the previous frame EBP, the return address, and the parameters of the function. Thus, in this embodiment, copy 314 includes a copy of the data representing the previous frame EBP, the return address, and the parameters of the function (in the first state of stack frame 304).

In one embodiment, the address of copy 314 is saved as an entry in a hash table 310, using EBP as a pointer to the address. Once a copy of the first state of stack frame 304 is saved, completion of the prologue is initiated (operation 212), and function A is permitted to begin process execution.

Figure 3B:
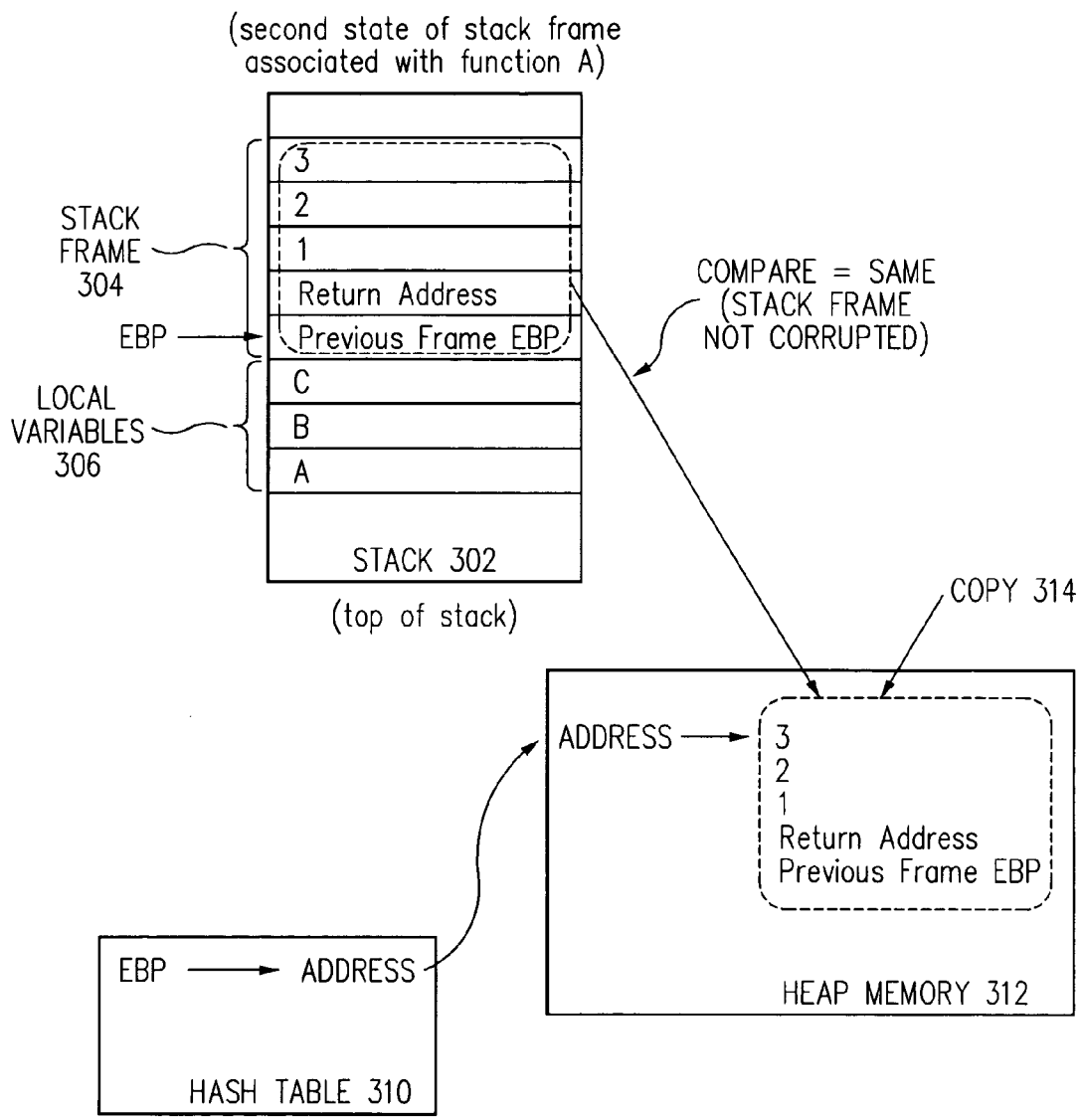
FIG. 3B illustrates a pseudocode representation of a second state of the stack frame of FIG. 3A with no detected stack frame corruption in accordance with one embodiment of the present invention.

FIG. 3B illustrates a pseudocode representation of a second state of stack frame 304 with no detected stack frame corruption in accordance with one embodiment of the present invention. Referring now FIGS. 2A, 2B, and 3B, in one embodiment, the epilogue of function A is stalled (operation 214) and stack frame 304 is in a second state. In the present example, the second state of stack frame 304 includes data representing the previous frame EBP, the return address, and the parameters of the function. These data in the second state of stack frame 304 should be the same as the data in the first state of stack frame 304, unless a stack frame corruption occurred during execution of function A.

Copy 314, i.e., the copy of the first state of stack frame 304, is located (operation 216), for example, using EBP as a key to the address in heap memory 312 stored in hash table 310. The second state of stack frame 304 is compared to copy 314, for example, compared byte to byte, to determine whether the second state of stack frame 304 differs from the first state of stack frame 304, i.e., copy 314 (operation 218). For example, the bytes representing "3", "2", and "1", the return address, and the previous frame EBP in the second state of stack frame 304 are compared, respectively, to the bytes representing "3", "2", and "1", the return address, and the previous frame EBP in copy 314.

In the present example, no differences are detected, and stack frame 304 is determined not to be corrupted (operation 220). The epilogue is initiated (operation 226) and allowed to complete, thus permitting execution of function A to complete.

Figure 4A:
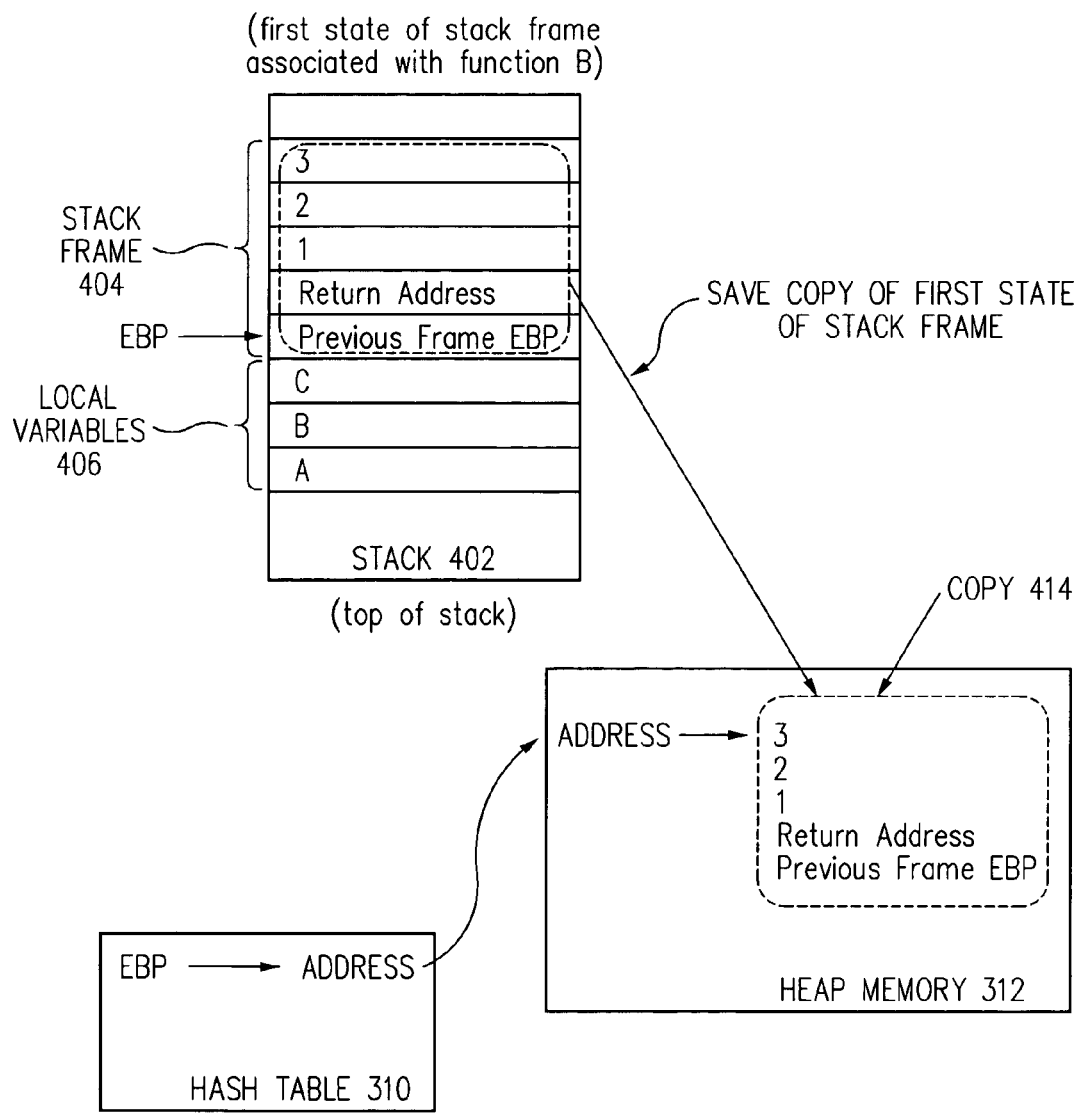
FIG. 4A illustrates a pseudocode representation of a first state of a stack frame saved as a copy to a heap memory in accordance with another embodiment of the present invention.

FIG. 4A illustrates a pseudocode representation of a first state of a stack frame 404 saved as a copy 414 to heap memory 312 in accordance with another embodiment of the present invention. Referring now to FIGS. 2A, 2B, and 4A, as illustrated, a stack 402 including stack frame 404 and a set of local variables 406 associated with a function B of an application is represented in a first state during the operations of method 200 when the completion of the prologue of function B is stalled. Thus, in one embodiment, the prologue of function B is stalled (operation 208) and a copy of the first state of stack frame 404, illustrated as a copy 414, is saved to a location in memory, such as a heap memory 312 (operation 210).

In one embodiment, as earlier described with reference to operation 210 of method 200 (FIG. 2), the first state of stack frame 404 includes data representing the previous frame EBP, the return address, and the parameters of the function. Thus, in this embodiment, copy 414 includes a copy of the data representing the previous frame EBP, the return address, and the parameters of the function (in the first state of stack frame 404).

In one embodiment, the address of copy 414 is saved as an entry in a hash table 310, using EBP as a pointer to the address. Once a copy of the first state of stack frame 404 is saved, completion of the prologue is initiated (operation 212), and function B is permitted to begin process execution.

Figure 4B:
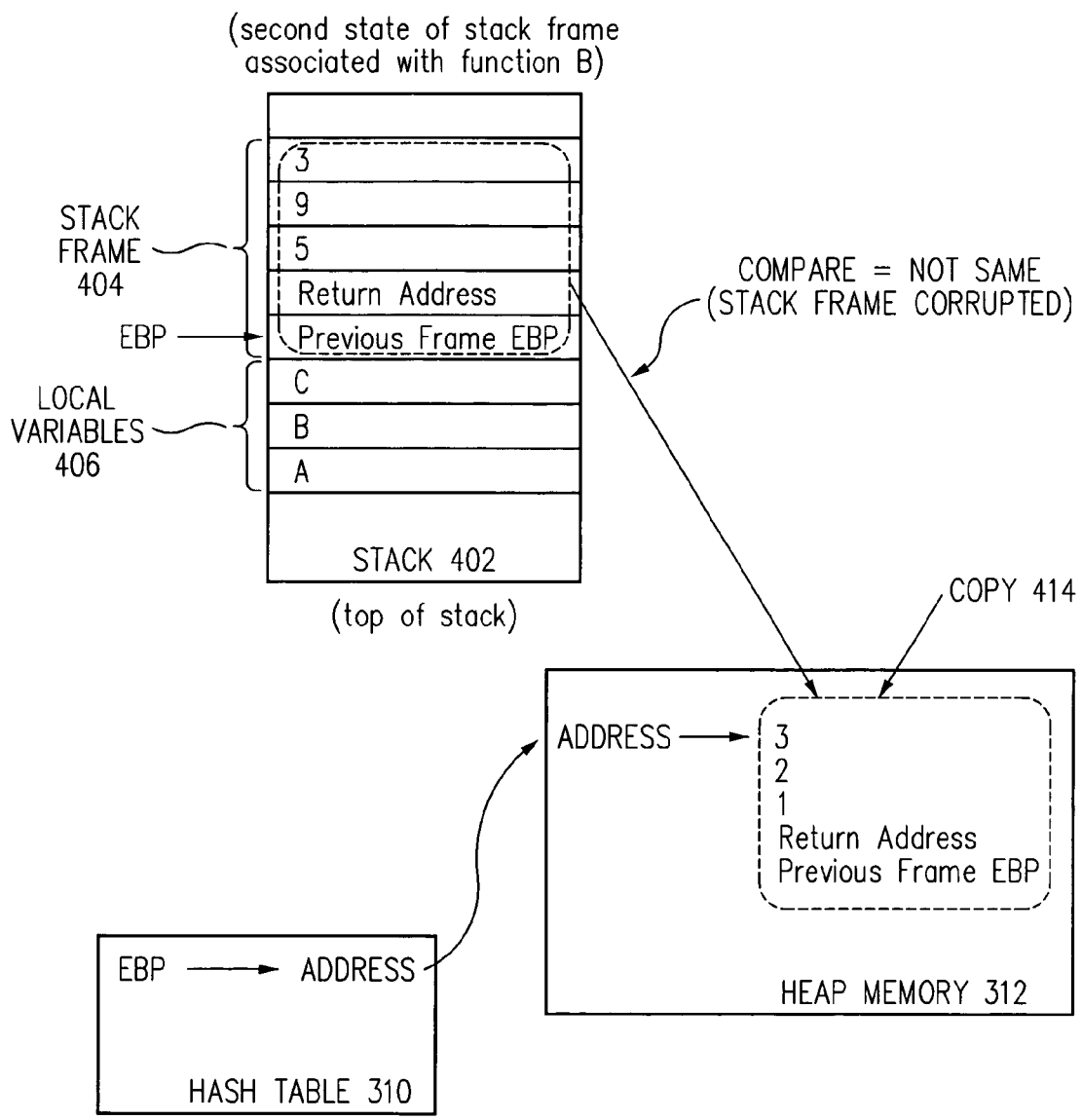
FIG. 4B illustrates a pseudocode representation of a second state of the stack frame of FIG. 4A with a detected stack frame corruption in accordance with another embodiment of the present invention.

FIG. 4B illustrates a pseudocode representation of a second state of stack frame 404 with a detected stack frame corruption in accordance with another embodiment of the present invention. Referring now FIGS. 2A, 2B, and 4B, in one embodiment, the epilogue of function B is stalled (operation 214) and stack frame 404 is in a second state. In the present example, the second state of stack frame 404 includes data representing the previous frame EBP, the return address, and the parameters of the function. As earlier described, these data in the second state of stack frame 404 should be the same as the data in the first state of stack frame 404, unless a stack frame corruption occurred during execution of function B.

Copy 414, i.e., the copy of the first state of stack frame 404, is located (operation 216), for example, using EBP as a key to the address in heap memory 312 stored in hash table 310. The second state of stack frame 404 is compared to copy 414, for example, compared byte to byte, to determine whether the second state of stack frame 404 differs from the first state of stack frame 404, i.e., copy 414 (operation 218).

For example, the bytes representing "3", "9", and "5", the return address, and the previous frame EBP in the second state of stack frame 404 are compared, respectively, to the bytes representing "3", "2", and "1", the return address, and the previous frame EBP in copy 414.

In the present example, differences are detected, for example, due to a stack-based overflow that occurred during execution of function B, and stack frame 404 is determined to be corrupted (operation 220). The data representing the previous frame EBP, the return address, and the parameters of the function in the second state of stack frame 404 are overwritten with the data representing the previous frame EBP, the return address, and the parameters of the function in the copy of the first state of stack frame 404, thus restoring stack frame 404 to an initial (uncorrupted) state. The epilogue is initiated (operation 226) and allowed to complete, thus permitting execution of function B to complete. Optionally, a notification of the stack frame corruption is provided (operation 222).

In the preceding description, an embodiment is described as applied to a single function. In other examples, embodiments of the invention are applied to all functions having a standard prologue and a standard epilogue within one or more applications executed on a computer system. Thus, stack frame corruptions in any of the one or more applications' functions are detected and the stack frames restored allowing continued availability of the one or more applications.

In particular, in one embodiment, stack frame corruption detection and recovery application 106 is applied to applications defined as critical processes in a computer system to provide continued availability of the critical processes beyond stack frame corruptions. In one embodiment, stack frame corruption detection and recovery application 106 is loaded into critical processes of a computer system as further described herein with reference to FIG. 5.

Figure 5:
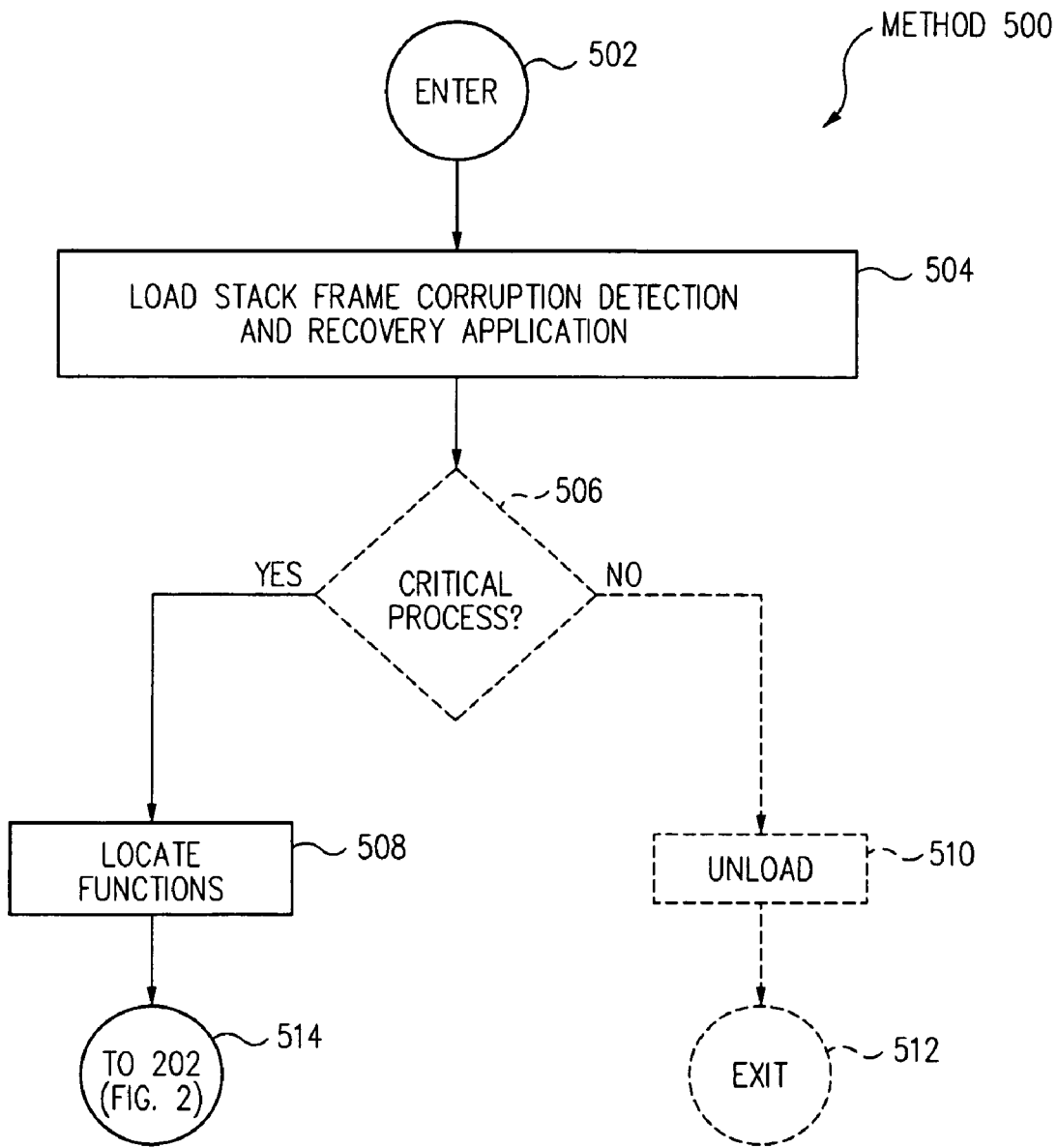
FIG. 5 illustrates one example of a process flow diagram for loading the stack frame corruption detection and recovery application of FIG. 1 into critical process applications of the host computer system of FIG. 1 in accordance with one embodiment of the present invention.

FIG. 5 illustrates one example of a process flow diagram for loading stack frame corruption detection and recovery application 106 into critical process applications of host computer system 102 in accordance with one embodiment of the present invention. Referring now to FIGS. 1 and 5 together, from an ENTER operation 502, processing transitions to a LOAD STACK FRAME CORRUPTION DETECTION AND RECOVERY APPLICATION operation 504.

In LOAD STACK FRAME CORRUPTION DETECTION AND RECOVERY APPLICATION operation 504, stack frame corruption detection and recovery application 106 is loaded into one or more applications prior to execution of the application, preferably during start up, for example, during a start up operation on host computer system 102. In one embodiment, stack frame corruption detection and recovery application 106 is loaded as a library into one or more applications determined to be critical process applications by a user, or as determined in an optional CRITICAL PROCESS check operation 506. Processing transitions from LOAD STACK FRAME CORRUPTION DETECTION AND RECOVERY APPLICATION operation 504 to a CRITICAL PROCESS check operation 506, or directly to a LOCATE FUNCTIONS OPERATION 508, if CRITICAL PROCESS check operation 506 is not performed.

In CRITICAL PROCESS check operation 506, a determination is made whether an application that stack frame corruption detection and recovery application 106 is loaded into is a critical process. In one embodiment, a critical process is defined as an application that requires protection from a stack corruption in accordance with an embodiment of the present invention. Examples of critical processes can include web server applications, mail server applications, and database applications. For example, an identifier associated with the application, such as the application name, is compared against a critical process list present in stack frame corruption detection and recovery application 106. In one embodiment, entries in the critical process list are user-defined. In other embodiments, the entries are defined by default, and in yet other embodiments, the entries are defined by default and are user extensible. In the present example, an identifier that matches an entry is defined as a critical process, whereas an identifier that does not match an entry is not a critical process.

Upon a determination that the application is not a critical process, processing transitions from optional CRITICAL PROCESS check operation 506 to an UNLOAD operation 510.

In UNLOAD operation 510, stack frame corruption detection and recovery application 106 is unloaded from the application, and processing transitions from optional UNLOAD operation 510 to an EXIT operation 512 and exits method 500.

Otherwise, referring again to CRITICAL PROCESS check operation 506, upon a determination that the application is a critical process, processing transitions to a LOCATE FUNCTIONS operation 508.

In LOCATE FUNCTIONS operation 508, functions within the application having a standard prologue and epilogue are located. As earlier described with reference to FIG. 2 and method 200, generally, the code of an application is organized into functions that execute specific tasks, or procedures. The start of each function is signaled using a prologue, and the end of the function is signaled using an epilogue.

In one example, stack frame corruption detection and recovery application 106 scans the code of an application in physical memory for the presence of standard prologue and epilogue signatures, e.g., code segments, which are then verified, for example, as matching an entry on a list of standard prologues and standard epilogues maintained in or accessible by stack frame corruption detection and recovery application 106.

In some instances, there can be more than one standard epilogue associated with a standard prologue, such as when conditional branches occur in an application. In these instances, stack frame corruption detection and recovery application 106 determines an entry point to the application and the application is scanned to locate each call to a function. The address of each of the calls represents an address where a function starts. The address of each call is saved for scanning reference.

The function is scanned immediately after the address of the call, following the potential paths the function's branches take until a standard epilogue is reached in the execution flow. In one embodiment, the instructions in the execution flow are compared against a list of known standard epilogues to see if the instructions match. If the current instruction does not match an entry in the list of known standard epilogues, the particular flow of execution for the function is disregarded.

Those of skill in the art will recognize that other techniques for locating standard prologues and standard epilogues of functions within an application can also be used, and that the above examples are not intended to be limiting upon the invention.

Upon locating the standard prologue and standard epilogue of functions in an application(s), processing transitions from LOCATE FUNCTIONS operation 508 to an operation 514 where processing exits method 500 and transitions to operation 202 of method 200 (FIG. 2).

Referring again to FIG. 1, stack frame corruption detection and recovery application 106 is in computer memory 112. As used herein, a computer memory refers to a volatile memory, a non-volatile memory, or a combination of the two.

Although stack frame corruption detection and recovery application 106 is referred to as an application, this is illustrative only. Stack frame corruption detection and recovery application 106 should be capable of being called from an application or an operating system. In one embodiment, an application is generally defined to be any executable code. Moreover, those of skill in the art will understand that when it is said that an application or an operation takes some action, the action is the result of executing one or more instructions by a processor.

While embodiments in accordance with the present invention have been described for a client-server configuration, an embodiment of the present invention may be carried out using any suitable hardware configuration involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, servers on a network and signals transmitted over a network representing computer readable code.

Further herein, a means for performing a particular function is accomplished using the appropriate computer-readable instructions and the related hardware necessary to performing the function.

As illustrated in FIG. 1, this medium may belong to the computer system itself. However, the medium also may be removed from the computer system. For example, as earlier described, stack frame corruption detection and recovery application 106 may be stored in memory 136 that physically resides in a location different from processor 108. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server system 130 is a portable computer, a workstation, a two-way pager, a cellular telephone, a digital wireless telephone, a personal digital assistant, a server computer, an Internet appliance, or any other device that includes components that can execute functionalities in accordance with at least one of the embodiments described herein. Similarly, in another embodiment, host computer system 102 and/or server system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the present invention can be implemented in a wide variety of computer system configurations. In addition, the detection and recovery functionalities could be stored as different modules in memories of different devices. For example, stack frame corruption detection and recovery application 106 could initially be stored in server system 130, and then as necessary, a portion of stack frame corruption detection and recovery application 106 could be transferred to host computer system 102 and executed on host computer system 102. Consequently, part of the detection and recovery functionalities would be executed on processor 132 of server system 130, and another part would be executed on processor 108 of host computer system 102. In view of this disclosure, those of skill in the art can implement various embodiments of the present invention in a wide-variety of physical hardware configurations using an operating system and computer programming language of interest to the user.

In yet another embodiment, stack frame corruption detection and recovery application 106 is stored in memory 136 of server system 130. Stack frame corruption detection and recovery application 106 is transferred over network 126 to memory 112 in host computer system 102, separately, or optionally as part of another application, such as AV application 124. In this embodiment, network interface 138 and I/O interface 110 would include analog modems, digital modems, or a network interface card. If modems are used, network 126 includes a communications network, and stack frame corruption detection and recovery application 106 is downloaded via the communications network.

Thus, as described herein stack frame corruption detection and recovery application 106 detects stack frame corruptions in an application during run-time and restores the stack frames allowing the survival of the application beyond the stack frame corruptions.

This disclosure provides exemplary embodiments of the present invention. The scope of the present invention is not limited by these exemplary embodiments.

For example, although the disclosure describes exemplar functions for saving a copy of a first state of a stack frame to a location in memory that is referenced to a hash table, for defining a hash table that uses EBP as a key to the location of a saved first state of a stack frame, and for locating a saved copy of the first state of the stack frame, the exemplar functions are not intended to limit the scope of the present invention.

Numerous variations, whether explicitly provided for by the specification or implied by the specification or not, may be implemented by one of skill in the art in view of this disclosure.

What is claimed is:

1. A method comprising:
   stalling execution of a function, said function having an associated first state of a stack frame;
   saving a copy of said first state of said stack frame;
   initiating execution of said function;
   stalling completion of said function, said function having an associated second state of said stack frame;
   comparing said second state of said stack frame to said copy of said first state of said stack frame; and
   determining whether said stack frame is corrupted based on said comparing;
   upon a determination that said stack frame is corrupted, replacing said second state of said stack frame with said copy of said first state of said stack frame; and
   initiating completion of said function.

2. The method of claim 1, wherein said stalling execution of a function comprises:
   stalling completion of a prologue of said function.

3. The method of claim 2, wherein said initiating execution of said function comprises:
   initiating completion of said prologue.

4. The method of claim 2, wherein said prologue is a standard prologue.

5. The method of claim 1, wherein said stalling completion of said function comprises:
   stalling completion of an epilogue of said function.

6. The method of claim 5, wherein said initiating completion of said function comprises:
   initiating completion of said epilogue.

7. The method of claim 5, wherein said epilogue is a standard epilogue.

8. The method of claim 1, further comprising:
   generating a notification of a stack frame corruption.

9. The method of claim 1, further comprising:
   upon a determination that said stack frame is not corrupted, initiating completion of said function.

10. A method comprising:
    stalling completion of a prologue of a function, said function having an associated first state of a stack frame;
    saving a copy of said first state of said stack frame to a location in a memory;
    initiating completion of said prologue, wherein execution of said function is permitted;
    stalling completion of an epilogue of said function, said function having an associated second state of said stack frame;
    locating said copy of said first state of said stack frame;
    comparing said second state of said stack frame to said copy of said first state of said stack frame;
    determining whether said stack frame is corrupted based on said comparing;
    upon a determination that said stack frame is corrupted, replacing said second state of said stack frame with said copy of said first state of said stack frame; and
    initiating completion of said epilogue, wherein completion of said function is permitted.

11. The method of claim 10, wherein said prologue is a standard prologue and said epilogue is a standard epilogue.

12. The method of claim 10, wherein said determining whether said second state of said stack frame is corrupted comprises:
    determining whether said second state of said stack frame is the same as said first state of said stack frame; and
    upon a determination that said second state of said stack frame is not the same as said first state of said stack frame, determining that said stack frame is corrupted.

13. The method of claim 12, wherein said determining whether said second state of said stack frame is the same as said first state of said stack frame comprises:
    performing a byte to byte comparison of bytes in said second state of said stack frame to bytes in said first state of said stack frame;
    upon a determination that said bytes of said second state or said stack frame match said bytes of said first state of said stack frame, said second state of said stack frame is determined to be the same as said first state of said stack frame; and
    upon a determination that said bytes of said second state of said stack frame do not match said bytes of said first state of said stack frame, said second state of said stack frame is determined not to be the same as said second state of said stack frame.

14. A method comprising:
    hooking a standard prologue of a function, said function having an associated stack frame in a stack;
    hooking a standard epilogue of said function;
    stalling completion of said standard prologue, wherein execution of said function is stalled, said function having an associated first state of said stack frame;
    saving a copy of said first state of said stack frame to a location in memory different from said stack;
    initiating completion of said prologue, wherein execution of said function is initiated;
    stalling completion of said epilogue, wherein completion of said function is stalled, said function having an associated second state of said stack frame;
    locating said copy of said first state of said stack frame;
    comparing said second state of said stack frame to said copy of said first state of said stack frame;
    determining whether said stack frame is corrupted based on said comparing; and
    upon a determination that said stack frame is corrupted, replacing said second state of said stack frame with said copy of said first state of said stack frame; and
    initiating completion of said epilogue, wherein completion of said function is permitted.

15. The method of claim 14, the method further comprising:
    generating a notification of a stack frame corruption.

16. The method of claim 14, wherein said prologue is a standard prologue and said epilogue is a standard epilogue.

17. The method of claim 14, wherein said location in said memory different from said stack is a heap.

18. The method of claim 14, further comprising:
    saving an address of said location in said memory different from said stack to a hash table using a value of an EBP associated with said function in said stack as a pointer to said address.

19. The method of claim 18, wherein said copy of said first state of said stack frame is located using said EBP as a pointer to said address in said hash table.

20. A computer-program product selected from the group consisting of a CD-ROM disc, a DVD, a ROM card, a floppy disc, a magnetic tape, a computer hard drive, and a server on a network, the computer-program product comprising a tangible computer-readable medium containing computer program code for execution by a computer system, said computer program code comprising:
    a stack frame corruption detection and recovery application for execution by said computer system, said stack frame corruption detection and recovery application when executed by said computer system for determining whether a stack frame corruption of a stack frame associated with a function has occurred based upon a comparison of a first state of said stack frame with a second state of said stack frame; and
    upon a determination that said stack frame corruption has occurred, said stack frame corruption detection and recovery application when executed by said computer system for replacing said second state of said stack frame with said first state of said stack frame to permit continued availability of said function beyond said stack frame corruption.

* * * * *

UNITED STATES PATENT AND TRADEMARK OFFICE
CERTIFICATE OF CORRECTION

| | |
|---|---|
| PATENT NO. | : 7,272,748 B1 |
| APPLICATION NO. | : 10/803848 |
| DATED | : September 18, 2007 |
| INVENTOR(S) | : Matthew Conover and Sourabh Satish |

It is certified that error appears in the above-identified patent and that said Letters Patent is hereby corrected as shown below:

On the Title page, at Item [73], replace "Cuperino" with --Cupertino--; and
In Column 15, Claim 13, Line 57, replace "or" with --of--.

Signed and Sealed this

Tenth Day of June, 2008

JON W. DUDAS
*Director of the United States Patent and Trademark Office*